Dec. 14, 1937.  E. G. KIMMICH  2,102,560
BELT DRIVE
Filed June 22, 1935

Inventor
ELMER G. KIMMICH

By
Attorney

Patented Dec. 14, 1937

2,102,560

UNITED STATES PATENT OFFICE 2,102,560

BELT DRIVE

Elmer G. Kimmich, Akron, Ohio, assignor to Wingfoot Corporation, Wilmington, Del., a corporation of Delaware Application June 22, 1935, Serial No. 28,007

7 Claims. (Cl. 248—23)

This invention relates to belts and belt drives and, more particularly, to improvements in the basic concept of achieving proper drives in which the life of the belt is materially extended by operation under conditions as nearly ideal as practically possible, with a minimum of slippage or loss of driving power.

Prior to the present invention it has been well known to transmit power from a driving pulley to a driven pulley by flat belts, V-belts, ropes or the like. However, much difficulty has been experienced in achieving the driving force by flexible belts in all installations. This is due to many factors which include the natural stretch of the belt in use and the consequent dangers of running the belt too tightly or too loosely.

One manner of improving the drive has been to mount the motor on a slotted base or slide rails with longitudinal screw, so that periodically the motor position can be adjusted to tighten the belt. It has likewise been suggested that the motor be carried on a fixed pivot so that the inherent weight of the motor will keep a tension on the belt and serve to take up a certain amount of stretch that occurs in the belt in use without manual adjustment.

It has been found, however, that under various operating conditions the weight of the motor in relation to the pivotal mounting therefor may be too great or too little to maintain the proper tension on the belt for all conditions of operation so that the life of the belt is materially reduced by running either too tightly or so loosely that the driving pulley will spin the belt and burn spots thereon. Moreover, in drives such as illustrated in the above-mentioned patents, the torque of the driving pulley, particularly during the starting load, often serves to "pick up" the motor by having the driving pulley climb along the belt so that the motor climbs toward the driven pulley until the belt slackens and then the motor falls back, spinning rapidly, to burn a spot in the belt. Some of the objections to a dead-weight take-up by the motor have been reduced by incorporating springs in the motor mounting, which operate either with or against the motor weight, and yet it will be evident that these means do not solve or eliminate the difficulty but merely reduce the effect thereof. It has likewise been proposed to mount the motor on a pivot and provide a manually adjustable screw take-up to swing the motor and tighten the belt. This has not been found to be a satisfactory solution as constant attention to the drive is necessary with periodic tightening of the screw to take up the stretch of the belt. Moreover, it lends itself to applying too great a tension on the belt which materially reduces the life thereof.

As a further example of difficulties heretofore encountered, a particular installation made in accordance with prior-known procedure and structure will now be considered. A small electric motor, in approximately the five-horsepower class, was provided to operate a small compressor having a relatively high starting load. A multi V-belt drive was employed between the motor and the compressor with the motor mounted in the customary manner on slide rails with a manually operated screw adjustment for tension. It was found that the motor bearings would not stand continuously the amount of pressure due to the tension required by the belts during the starting period. To overcome this difficulty with the bearings, the drive was operated at too low a tension and several sets of belts were destroyed by severe slippage and much power was lost, and frequently the compressor would not start. An ordinary type pivoted motor base, was next installed, hoping to get satisfactory operation. It was found, however, that the life of the driving belts was still extremely short and the installation was causing considerable trouble and demanded much servicing. A very careful examination of the apparatus in use indicated that when the motor was turned on and received the heavy starting load the motor pulley climbed up on the belts until the slack on the slack-side of the belts slipped over the pulley to permit the motor to fall back to starting position with a rapidly spinning pulley, which thereupon burnt the belts in the spot of contact. It would have been possible to put a greater initial tension on the belts either by moving the center of gravity of the motor farther away from the pivot point or by use of tensioning springs and adjustment screws. This would have eliminated the climbing motor but experience taught that it would very materially have reduced the life of the belts which would wear out very shortly in service due to the heavy tension thereon.

The difficulties and objections of the drive just described were solved and corrected by changing the relation of the pivot point to the tight side of the belt and the motor torque properly utilized so that the tension is high during the starting period but automatically reduces thereafter.

This led to the discovery that for any one drive there is one best point for the motor pivot while utilizing the motor torque, and further to discover that no commercial pivot bases permit proper adjustment of the pivot to attain this ideal under various operating conditions.

It is an object of the present invention to provide a motor base which permits substantially unlimited selection of the pivoting point so that the best mounting point may be used for each case.

Another object of the invention is to teach and provide principles for coordinating the position of a pivotal mounting for a belt-driving motor and the torque characteristics of said motor so that the belt will effect a positive, non-slipping, long-wearing drive and in which the belt is subjected to a tension at all times just greater than the minimum to effect the drive regardless of the varying load on the motor.

The foregoing and other objects of the invention are achieved by the methods and apparatus hereafter described and illustrated in the accompanying drawing wherein.

Figure 1:
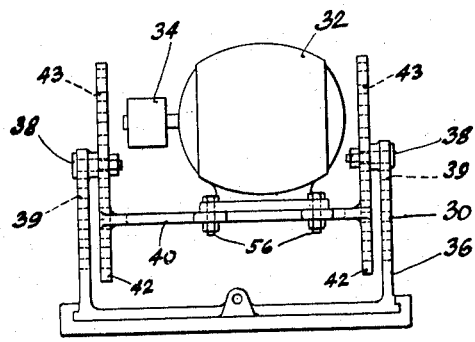
Fig. 1 is an end elevation of one form of apparatus constructed in accordance with the principles of the invention.
Figure 2:
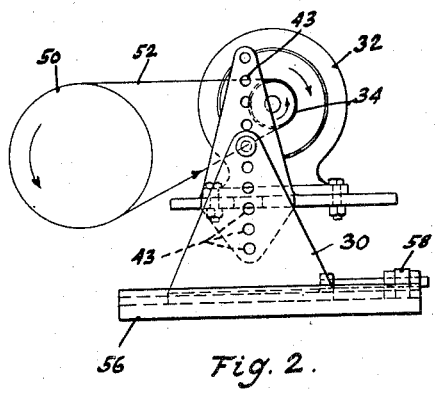
Fig. 2 is a side elevation of the mechanism shown in Fig. 1.

Briefly, it is the broad concept of the invention to employ a belt drive in which the motor or other means turning the driving pulley is mounted to pivot about an axis which falls substantially at or closely adjacent to the plane of the tight side of the belt. The pivotal mounting for the motor or the like is furthermore positioned so that the weight of the motor will cause it to turn about the pivot and normally function to tighten the belt against the pulley with a relatively light, initial tension. Also the torque characteristics of the motor are utilized to increase the tension on the belt as the load increases and reduce the tension when the load diminishes.

Reference should be had to Figures 8 to 11 inclusive, which illustrate the various ways in which the principles of the invention are applied to belt drives. It will be recognized from a study of the said figures that in all cases the weight of the motor turning about the pivotal mounting therefor will apply a relatively light initial tension on the driving belt. Likewise the inherent operation of applicant's improved belt drive will be apparent from the diagrammatic views. Briefly, by placing the pivotal mounting for the motor substantially on or adjacent to the plane of the taut side of the belt or to an extension thereof the pull of the belt upon the motor as created by its torque will be approximately directly through the pivotal mounting so that it is substantially impossible for the motor to climb or pull itself up on the belt, thereby eliminating any chance for the motor to spin and burn the belt. Moreover, the rotary torque tending to turn the motor field in a direction opposite to the armature will cause the motor field mounting to turn on its pivot, as indicated by the arrows, to apply a greater or less tension on the belt as the load varies.

In actual practice the pivot of the motor mounting is preferably placed a small distance to one side of the plane of the taut side of the belt so that in the use of the drive if the belt or belts should stretch the pivot point will move toward the plane and finally into it and possibly slightly beyond it on the other side. This practice still further eliminates constant servicing of the belt drive provided the belt is one of sufficiently low stretch characteristics.

Referring now to Figures 1 to 7 which illustrate various types of apparatus constructed in accordance with the invention herein disclosed, the numeral 30 indicates generally a pivotal support for an electric motor 32 equipped with a driving pulley 34. The pivotal support 30 includes a base 36 which pivotally mounts bracket 40 as by pins 38 which are secured in any pair of aligned holes 39 in the base 36. The bracket 40 is provided with side flanges 42 having a plurality of vertically aligned holes 43 therein which function to engage with the mounting pins 38 secured to the base 36. The mounting pins 38, positioned in any of the holes 39, may of course engage in any of the holes 43 provided in the side flanges 42 but are carefully positioned in the proper holes to insure the pivotal mounting point of the motor falling substantially on or near the taut side of the belt or an extension thereof as heretofore described. This relation is shown in Figs. 8 to 11 and is seen again in Fig. 2, which illustrates a drive from the motor 32 and its pulley 34 to a driven wheel 50 through friction belt 52.

In order to provide further adjustment to insure proper positioning of the pivot point or mounting for the motor, the motor 32 is adjustably secured to the bracket 40 by suitable means such as longitudinal slots in the bracket which receive fastening bolts 56 extending from the motor. Likewise, if desired the base 36 may be adjustably secured to a bottom plate 56 through the agency of hand screws 58. Thus, both a vertical and horizontal adjustment of the relation of the driving pulley and the pivotal mounting for the motor is provided to readily permit the application of the principles of the invention to substantially any installation.

Figure 3:
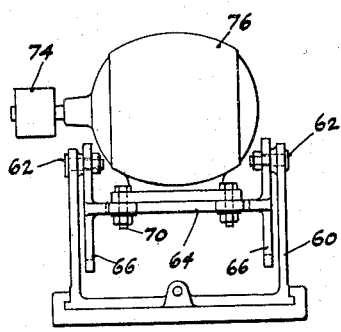
Fig. 3 is an end elevation of a modified form of apparatus embodying the invention.
Figure 4:
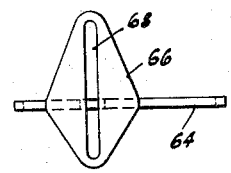
Fig. 4 is a side elevation of the motor-mounting bracket incorporated in the apparatus of Fig. 3.
Figure 5:
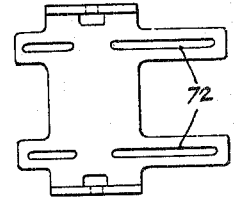
Fig. 5 is a plan view of the bracket shown in Fig. 4.

In the modified form of the apparatus shown in Figs. 3 to 5, a narrow standard 60 pivotally mounts by way of pins 62, a motor bracket 64 having side flanges 66, which are formed with slots 68 that adjustably receive the mounting pins 62 which can be clamped where desired to effect the proper drive and the pivotal mounting. The base of the motor is adjustably secured by bolts 70 to slots 72 formed in the bracket 64 as above described with respect to the apparatus of Figs. 1 and 2. It will be seen that in this form of the invention the pulley 74 of the motor 76 extends laterally beyond the pivotal motor mounting. This may facilitate the mounting of the belt or the operation of the unit in certain installations. The adjustment of the drive is similar to that above described and will be evident.

Figure 6:
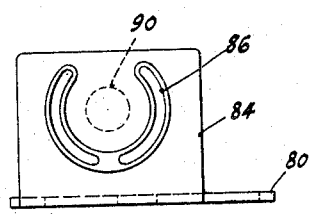
Fig. 6 is a side elevation of still another modification of the motor-mounting bracket.
Figure 8:
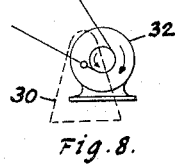
Figs. 8, 9, 10 and 11 illustrate diagrammatically the application of the principles of the invention to substantially any type of drive.
Figure 10:
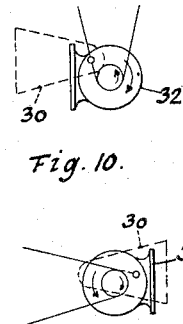
Figure 9:
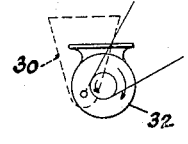
Figure 11:
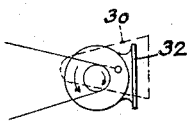
Figure 7:
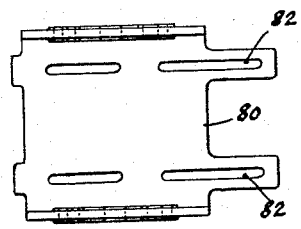
Fig. 7 is a plan view of the modified bracket shown in Fig. 6.

In Figures 6 and 7 has been shown a modified form of motor-mounting bracket generally similar to the bracket illustrated in Figures 4 and 5 and described above. In the bracket of Figures 6 and 7 the numeral 80 illustrates the plate which is provided with longitudinal slots 82 which are adapted to adjustably receive the bolts from the electric motor. Side flanges 84 integrally secured to the plate 80 complete the bracket with the flanges 84 being formed with one or more arcuate slots 86 which are adapted to adjustably receive the pivotal pins or bosses formed on the standard or base of the pivotal mounting. The arrangement of the slot 86 is such that by moving the pivot pins around the slot the pivot for the motor can be positioned substantially anywhere around the pulley that is desired. To indicate this general relation a motor pulley 90 has been dotted in the center of the slot 86 as seen in Fig. 6.

It will be appreciated that various forms of apparatus other than those particularly described can be provided in accordance with the principles of the invention to permit the use of the principles of the invention in the establishment of belt drives. For example, instead of mounting the motor upon a pivot, the load itself may be so mounted. Moreover, it should be understood that while the invention has been described solely with electric motors that the features thereof can be used with any other prime movers or driving pulleys with the same advantageous results.

While several forms of the principles, method and apparatus of the present invention have been described in detail, it should be recognized that the invention is not limited thereto or thereby but is defined in the appended claims.

What I claim is:

1. In combination, a prime mover, a plate, means adjustably securing the prime mover to the plate, side flanges on the plate, a base pivotally secured to the side flanges of the plate, means on the side flanges whereby the pivotal connection between the base and the flanges can be adjusted circumferentially of the prime mover and a support for the base, and means for adjusting the relation of the base and support.

2. In combination, a prime mover, a plate, means adjustably securing the prime mover to the plate, side flanges on the plate, a base pivotally secured to the side flanges of the plate, means on the side flanges whereby the pivotal connection between the base and the flanges can be adjusted circumferentially of the prime mover.

3. In combination, a prime mover, a plate, means adjustably securing the prime mover to the plate, side flanges on the plate, a base pivotally secured to the side flanges of the plate, and means on the side flanges whereby the pivotal connection between the base and the flanges can be adjusted vertically and horizontally relative to the prime mover.

4. In combination a base, a support, side flanges on said support pivotally mounted on said base for swinging movement about a horizontal axis, and a prime mover slidably mounted on said support and having its axis of rotation disposed parallel to the axis of swinging movement of said support, the pivotal mounting of said support including slots in said side flanges extending transversely to the plane of said support and the slidable mounting of said prime mover including slots in said support extending transversely to the axis of swinging movement thereof.

5. In combination with a support of a motor-supporting bracket pivotally mounted on said support, said bracket having a portion to receive the motor, a motor, means for adjustably clamping said motor in a plurality of different positions on said portion and adjustable means for the pivotal mounting for said bracket whereby the same may be varied relative to the axis of the motor to adjust the motor closer to or farther from the point of pivotal mounting, the latter adjustment being in a direction at a substantial angle to the direction of adjustment of said motor with respect to said portion, and the axis of the pivotal mounting being arranged substantially parallel to the axis of rotation of the motor.

6. In combination with a support of a motor-supporting bracket pivotally mounted on said support, said bracket having a portion to receive the motor, a motor, means for adjustably clamping said motor in a plurality of different positions on said portion and adjustable means for the pivotal mounting for said bracket whereby the same may be varied relative to the axis of the motor to adjust the motor closer to or farther from the point of pivotal mounting, the latter adjustment being in a direction at substantially right angles to the direction of adjustment of said motor with respect to said portion, and the axis of the pivotal mounting being arranged substantially parallel to the axis of rotation of the motor.

7. In combination, a support, a motor-supporting bracket pivotally mounted on said support, said bracket having a portion on which the motor is mounted, a motor mounted on said portion to one side of the vertical axis through said pivotal mounting whereby the weight of the motor on said support may be utilized to tension a belt, and means for adjusting the pivotal mounting to various positions along a line substantially parallel with the direction of action of the weight of the motor on said bracket, whereby to bring the pivotal mounting substantially in the plane of that side of a belt driven by said motor which receives the driving torque.

ELMER G. KIMMICH.